United States Patent
Lin

(10) Patent No.: US 8,477,365 B2
(45) Date of Patent: Jul. 2, 2013

(54) METHOD AND SYSTEM FOR PRELIMINARY DATA PROCESSING BEFORE PRINTING

(75) Inventor: Fu-Chang Lin, Taipei (TW)

(73) Assignee: Primax Electronics, Ltd., Taipei (TW)

( * ) Notice: Subject to any disclaimer, the term of this patent is extended or adjusted under 35 U.S.C. 154(b) by 1482 days.

(21) Appl. No.: 11/099,634

(22) Filed: Apr. 6, 2005

(65) Prior Publication Data

US 2006/0227369 A1    Oct. 12, 2006

(51) Int. Cl.
  *G06F 3/12* (2006.01)
  *H04N 1/60* (2006.01)

(52) U.S. Cl.
  USPC .............. 358/1.9; 358/1.15; 382/162

(58) Field of Classification Search
  USPC ............ 358/1.15, 1.9, 1.17; 382/239
  See application file for complete search history.

(56) References Cited

U.S. PATENT DOCUMENTS 5,604,847 A * 2/1997 Dennis et al. .............. 358/1.17
6,995,862 B1 * 2/2006 Murata et al. ............... 358/1.9

* cited by examiner

*Primary Examiner* — Gabriel Garcia
*Assistant Examiner* — Quang N Vo
(74) *Attorney, Agent, or Firm* — Kirton McConkie; Evan R. Witt

(57) ABSTRACT

A method and system for preliminary data processing before printing is disclosed. The steps executed by said system comprises: dividing a page into a plurality of bands including a Mth band and a (M+1)th band; converting a color format of the Mth band; transferring the Mth band to a printer for storing, and converting the color format of the (M+1)th band in the period of transferring the Mth band; and printing the Mth band, wherein the printing does not start until the printer receives 50%-100% bands. During the printing, the color format of the residual bands continues to convert and the converted residual bands continue to transfer to the printer until the page is finished printing.

14 Claims, 7 Drawing Sheets

METHOD AND SYSTEM FOR PRELIMINARY DATA PROCESSING BEFORE PRINTING

FIELD OF THE INVENTION

This invention relates generally to a method and system for preliminary data processing before printing, and more particularly to a method and system for rapidly converting a color format of a data before printing.

DESCRIPTION OF THE RELATED ART

Besides compiling and processing large amounts of data, modern computer system often includes graphics capabilities that allow the display and printing of graphic images. Printing a page of text, graphics and/or images requires the conversion of data from the format used on a host computer to a format used by the particular printer selected. Typically, the computer data is translated into a bit-map data file where each bit represents a dot on the printed page. The bit-map data file is usually generated within the host computer and transferred to the printer in compressed data format. The compressed bit-map data is expanded in the printer and is converted into the appropriate voltages to create a printed image.

On a typical laser printer, there may be 300, 600, or more pixels per inch. Each of the pixels is usually represented by a single data bit in the printer memory. At a resolution of 300 pixels per inch, a printer requires approximately 1MB memory to store the bit-map data file for an entire page. Some laser printers contain large memories and operate in a page mode, which means that the printer can store an entire page of data in bit-map form. Because of the large amount of memory required to store an entire page in bit-map form, some printers use a banding mode to reduce the amount of memory requirement. A printer with banding mode capability breaks the printed page down into a number of horizontal or vertical segments called "bands". The printer accepts the bit-map data for only one band at a time thus reducing the memory requirement. When the printer has processed the data for the first band, it can accept data for the second band and so forth. For example, if the printed page is broken down into four bands, the memory requirements are reduced by a factor of four because the printer need only store the bit-map data for one fourth of the page.

In printing, graphics and image processing are often necessary to convert colors from one representation (color format) into another. Many computer video monitors and scanners, for example, use red-green-blue (RGB) representations for colors, while printers typically represent colors in terms of the amounts of a variety of differently colored inks (for example, cyan-magenta-yellow-black (CMYK)). As such, in a typical computer system, the RGB color format used to produce an image upon a computer screen must be converted into a CMYK color format to facilitate printing of the image depicted on the screen. However, printers typically operate in a page mode to convert the color format. In page mode, the time requirement for the color format conversion and data compressing varies with the amount of data contained in an entire page. Therefore, a delay in output of the first page occurs easily.

Referring to FIG. 1A and FIG. 1B, FIG. 1A shows a system for converting color format in page mode. FIG. 1B shows a data process flow sequence including four stages. The system 10 includes a data distributing module 11 and a data processing module 12. In the first stage, the data distributing module 11 receives an object page data 20, and then outputs to a first memory 13. The first memory 13 receives the entire page of data 20, and transfers the data 20 to the data processing module 12. The first memory 13 also stores some META commands used for processing data 20. In the second stage, the data processing module 12 converts a color format of the data 20, for example, conversion from RGB format to CMYK format. Subsequently, the data 20 is translated into a bit-map form. The bit-map data is compressed and stored in a second memory 14. In the third stage, the data 20 stored in the second memory 14 is transferred back to the data distributing module 11. In the fourth stage, the entire page of data 20 is distributed to a printer 40 by the data distributing module 11. It is noted that one stage of the system 10 does not synchronize with another stage.

FIG. 1C shows a data structure of a graphic file processed by means of the page mode. The data structure 50 includes a GDI file header 51a, a GDI page header 52a, a plurality of page raw data 521,522,523,524 containing color format, a GDI page end 52b, a GDI page description format 53 and a GDI job end 51b. The four page raw data 521,522,523,524 is arranged in order as K-page raw data 521, Y-page raw data 522, M-page raw data 523, C-page raw data 524 and located between the GDI page header 52a and the GDI page end 52b.

For example, when a 96MB graphic file or a digital image file having RGB format is converted into a file having CMYK format, the size of the file increases to 128MB. The conventional method is dividing a multi-color page into four mono-color pages for converting the color format. That needs a "chromatographic step" by overlapping the four mono-color pages. After the step of chromatography, the size of the file changes from 128MB to 16MB. But the 16MB file still needs to be compressed before transferring to a printer. As stated above, the printer must wait for processing such a great volume of data before printing that the output of the first page is so long.

The cause of a delay in output of the first page is that the entire page is layer upon layer divided into four mono-color pages for color format converting. Therefore, the process time of a page is equal to the process time of four mono-color pages. In page mode, the processing of four mono-color layers is not parallel run. And the step for chromatography and for bit-map file converting is executed after the color format converting of all mono-color layers. To sum up, using the page mode for data process and transfer will make the first page printing output time slower while the page is complex and computer speed is not fast.

In view of the aforementioned disadvantages in conventional process and the advantage of banding mechanism on driver side is not applied to the printing system, the present inventor has devoted to improving and to innovating a method for shorting the output of the first page by converting color format rapidly.

SUMMARY OF THE INVENTION

The primary object of this invention is to provide a preliminary data processing before printing for shorten the output of the first page.

Another object of this invention is to use banding mode for converting the color format of the data to shorten the whole process time.

A further object of this invention is to make full use of the memory and to process band data under parallel run.

The invention discloses a method for preliminary data processing before printing, comprises: dividing a page into a plurality of bands including a Mth band and a (M+1)th band; converting a color format of the Mth band; transferring the Mth band to a printer for storing, and converting the color format of the (M+1)th band in the period of transferring the Mth band; and printing the Mth band, wherein the printing does not start until the printer receives 50%-100% bands. During the printing, the color format of the residual bands continues to convert and the converted residual bands continue to transfer to the printer until the page is finished printing.

Besides, the invention discloses a system for preliminary data processing before printing, comprises a data distributing module and a data processing module. The data distributing module receives a page of data, and divides the page of data into a plurality of bands to write into a memory unit, wherein the page of data has a first color format. The data processing module reads the bands stored in the memory unit, and converts the first color format into a second color format, wherein the second color format is a recognition format of a printer.

BRIEF DESCRIPTION OF THE DRAWINGS

The related drawings in connection with the detailed description of this invention, which is to be made later, are described briefly as follows, in which.

DETAILED DESCRIPTIONS OF THE PREFERRED EMBODIMENTS

Figure 2:
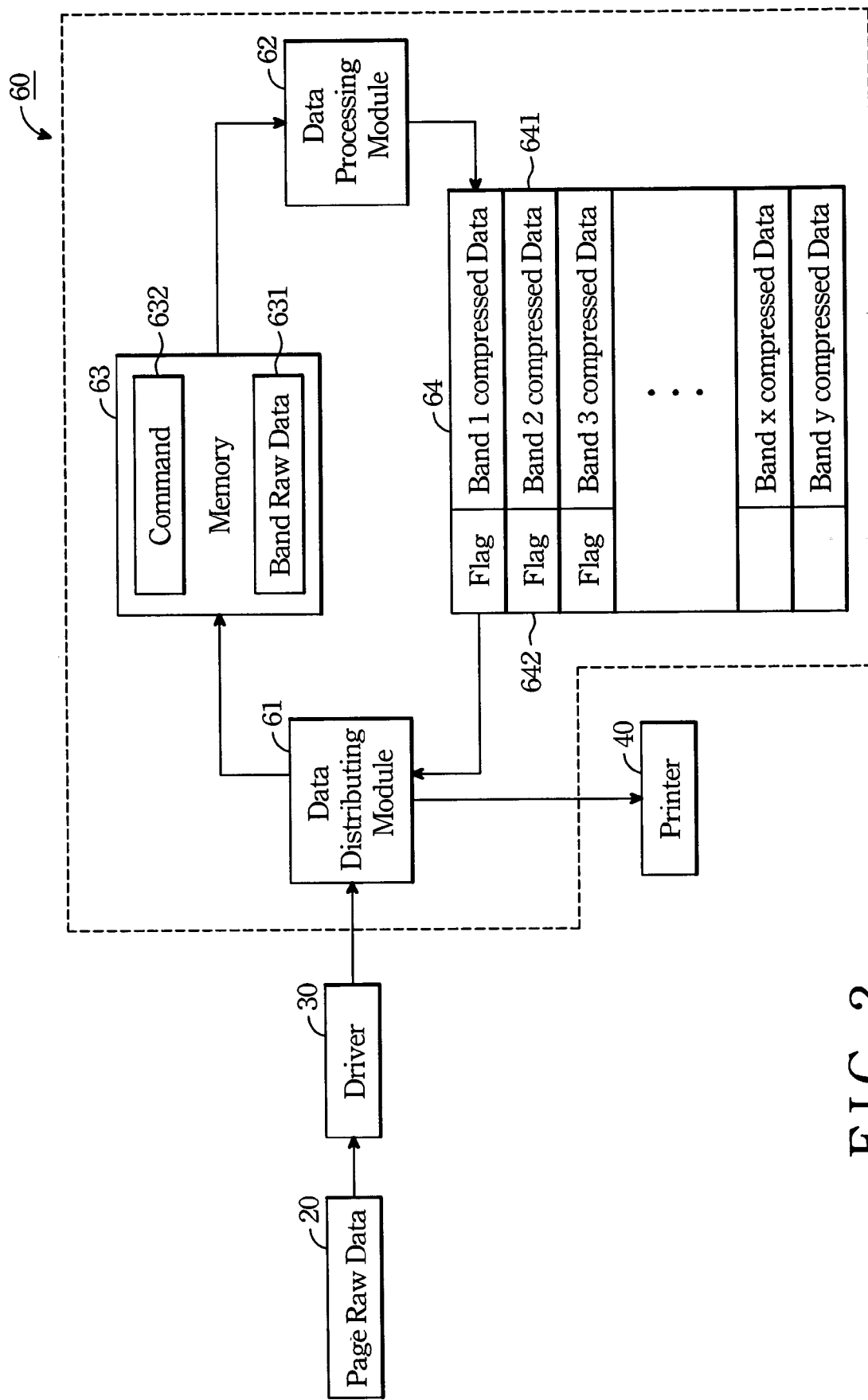
FIG. 2 is a system for preliminary data processing before printing according to this invention.

Referring to FIG. 2, a system for preliminary data pressing before printing according to this invention is shown. The system 60 comprises a data distributing module 61 and a data processing module 62. The data distributing module 61 receives an object page data 20 having a first color format, and divides the page of data 20 into a plurality of bands 631 to write into a memory unit 63. Subsequently, the data processng module 62 reads the bands 631 from the memory unit 63, and converts the first color format of the bands 631 into a second color format The data 20 is usually stored in the memory unit of the host computer and written into the data distributing module 61 through a driver 30. Said first color format is usually RGB format, and said second color format is a recogition format of a printer, such as CMYK format It is note that driver 30 also writes some META commands 632 accompanied the band 631 to store in the memory unit 30 to provide the data processing module 62 for the conversion, the screening and the compression.

The system 60 further comprises another memory unit 64 to store the bands 641 having the second color format. Data processing module 62 adds an identification mark 642, such as a flag, to each of said bands 641 having the second color format selectively. The bands 641 added identification mark 642 is stored in memory unit 64 to wait for distributing to a printer 40 via the data distributing module 61. Besides receiving the data 20 from the driver 30, the data distributing module 61 reads the bands 641 having second color format and transfers them to the printer 40 or a graph plotter. Each of said bands 641 having the second color format includes a plurality of mono-color layers. For instance, each of the bands has four mono-color layers—C, M, Y, K.

In a preferred embodiment, when the data distributing module 61 writes any one band 631 to the memory unit 63, the band 631 is transferred from the memory unit 63 into the data processing module 62 in real time. Thus, the volume requirement of the memory unit 63 can reduce because it only needs to store one band.

Figure 3:
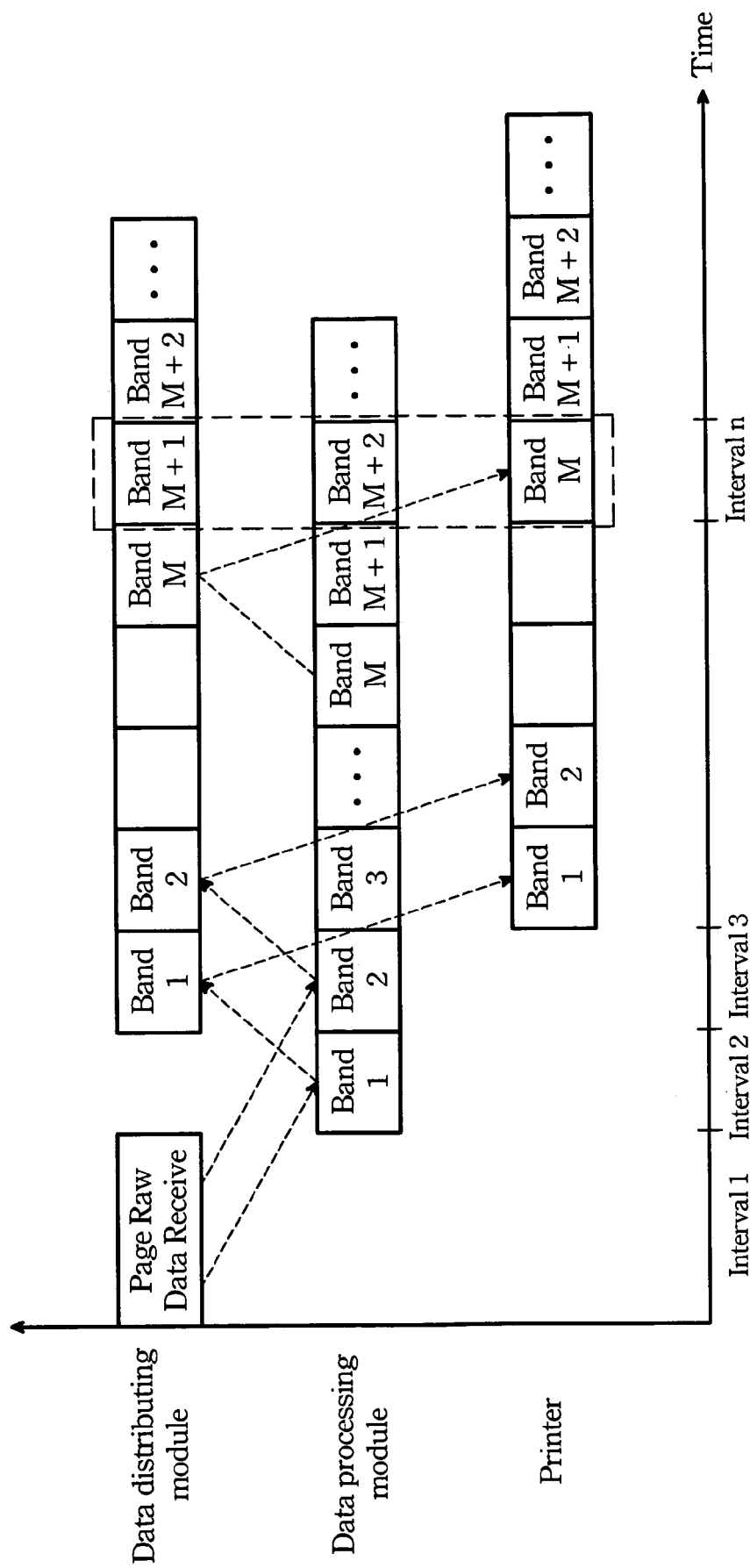
FIG. 3 is a data process flow sequence according to this invention.

Referring to FIG. 3, a data process flow sequence according to this invention is shown. The data process flow sequence is as the arrowhead. When the data distributing module receives a data, the method of this invention is performed by said system 60. First of all, a page is divided into a plurality of bands, such as band 1, band 2 . . . , band M shown in FIG. 3. In this step, the data distributing module transfers a page of data in segments to the data processing module. Subsequently, the color format of the Mth band is converted via the data processing module. After that, the Mth band is transferred to a printer for storing. In the period of transferring the Mth band, the color format of the (M+1)th band is converted. The dotted line indicates the path of the Mth band, and the movement is executed by the data distributing module. Finally, the Mth band is printed. And in the period of printing the Mth band, the (M+1)th band is transferred to the printer for storing and the color format of the (M+2)th band is converted.(framed in dotted line)

More description about FIG. 3 is following. As shown, the data distributing module receives a page of data in interval 1, and then divides the page of data into band1, band2 . . . , band M. In interval 2, the data processing module processes the band1, such as conversion of the color format, screening and compression. In interval 3, the data processing module finishes processing band1, and transfers it to the printer. At the same time, the data distributing module transfers the band2 to the data processing module. In interval n, the printer prints the band M; the data distributing module transfers the band M+1 to the printer, and the data processing module processes the band M+2. It is noted in the present invention that the printing does not start until the printer receives 50%- 100% bands. The conversion of the color format of the residual bands and the transferring of the converted residual bands to the printer are continued until the page is finished printing. In view of this, the time requirement for the printer waiting the band 1 is the sum of interval 1, interval 2 and interval 3. Emphasis is that the printer receives bands one by one, so it is unnecessary to wait for processing a whole page before printing. The method makes parallel run for the META command processes and output bands data for printing.

A direction of dividing the page is determined according to a direction of printing the page. Both a vertical direction and a horizontal direction of the page are possible to be selected. For example, if a page contains 6000 rows of data, it can be divided into 20-30 bands, 256 rows of data per band. In a preferred embodiment, the data processing module can further convert the bands into bit-map form, compresses these bit-map bands and labels the compressed bit-map bands after the step of converting the color format of the bands. When a bit-map band has been labeled, it is transferred immediately to the printer. By the way, the step of converting a color format of the band comprises converting the color format from RGB format to CMYK format.

Figure 4:
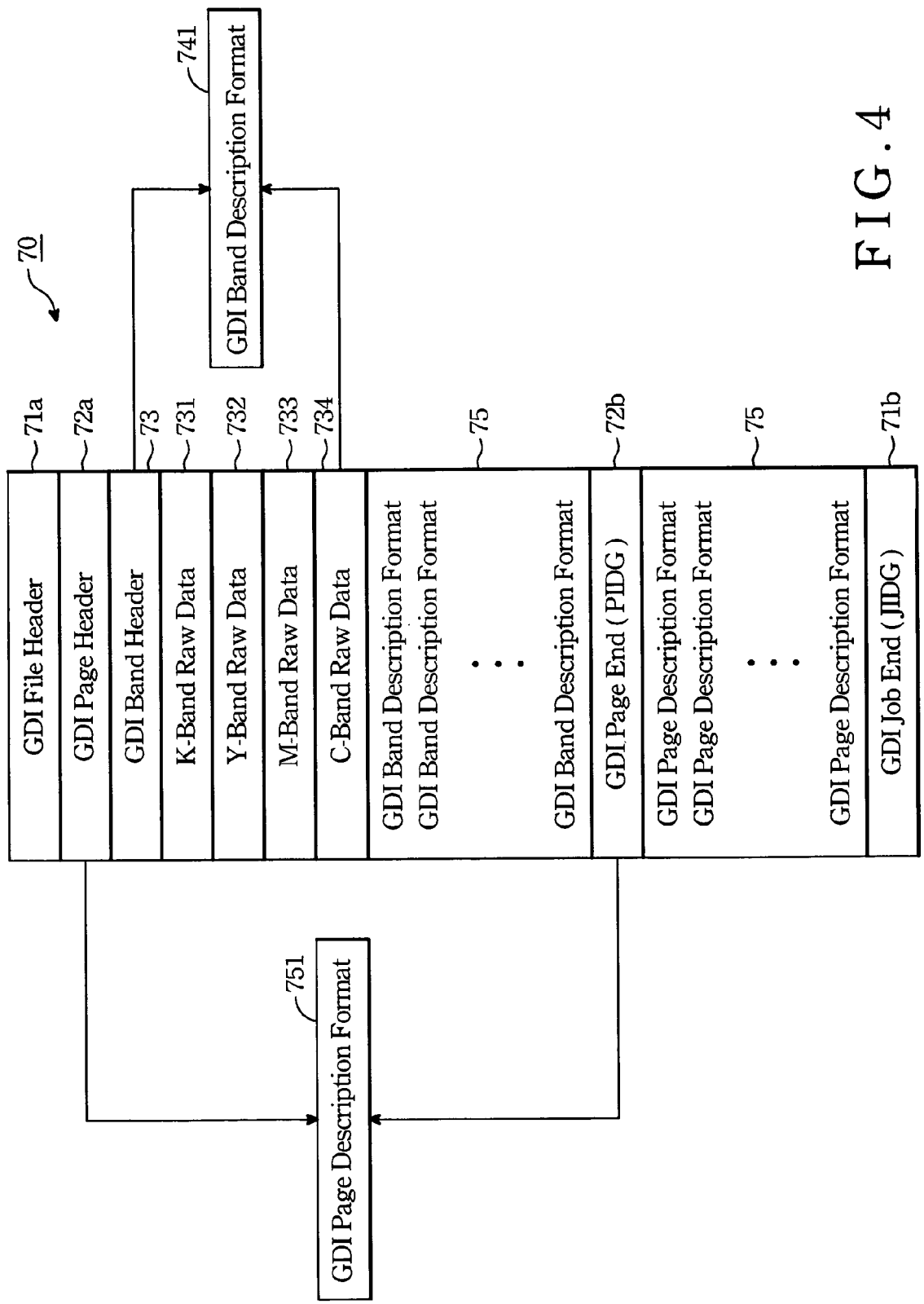
FIG. 4 is a data structure of a graphic file processed by means of this invention.

Referring to FIG. 4, a data structure of a graphic file processed by means of this invention is shown. The data structure 70 includes a GDI file header 71a, a GDI page header 72a, a variety of page raw data for describing color, a GDI page end 72b, a GDI page description format 75 and a GDI job end 71b. The difference from the prior art, the four page raw data, K-page raw data, Y-page raw data, M-page raw data and C-page raw data, are divided into bands, and adds a GDI band description format 74. The relation representation is that Page Description Format=N*Band Description Format+Page End, wherein N=1 or >1. For example, the band1 in FIG. 3 has four mono-color band row data-cyan(C)734, magenta(M)733, yellow(Y)732, black(K)731, located between the GDI page header 72a and the GDI page end 72b. A GDI band header 73 is over these four band row data 731,732,733,734. The GDI band description format 74 is below these four band row data 731,732,733,734, and includes a color format description about the band 1. Among these GDI page description formats 75, there is a GDI page description 751 about color format between the GDI page end 72b and the GDI job end 71b.

Figure 1A:
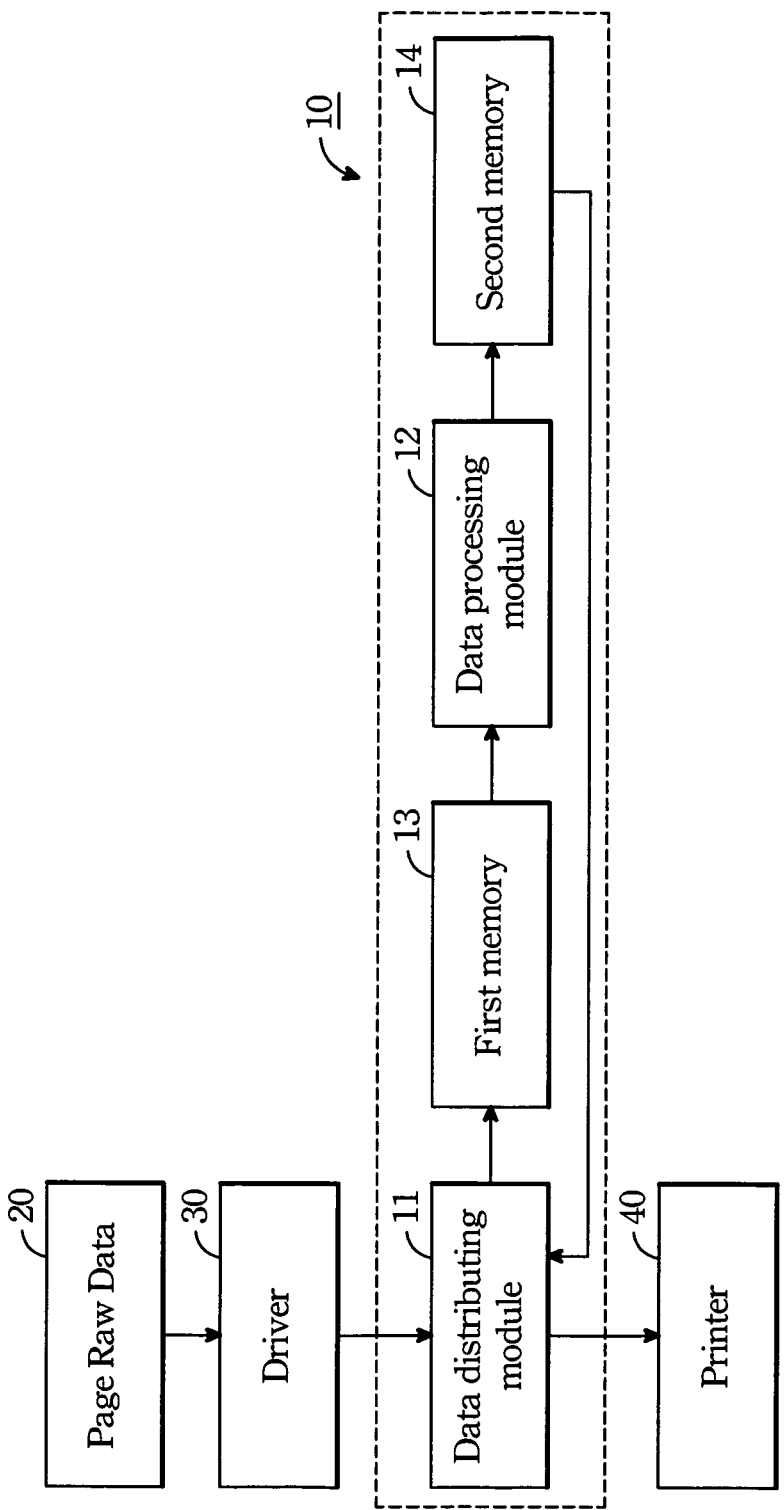
FIG. 1A is a system for converting color format in page mode.
Figure 1B:
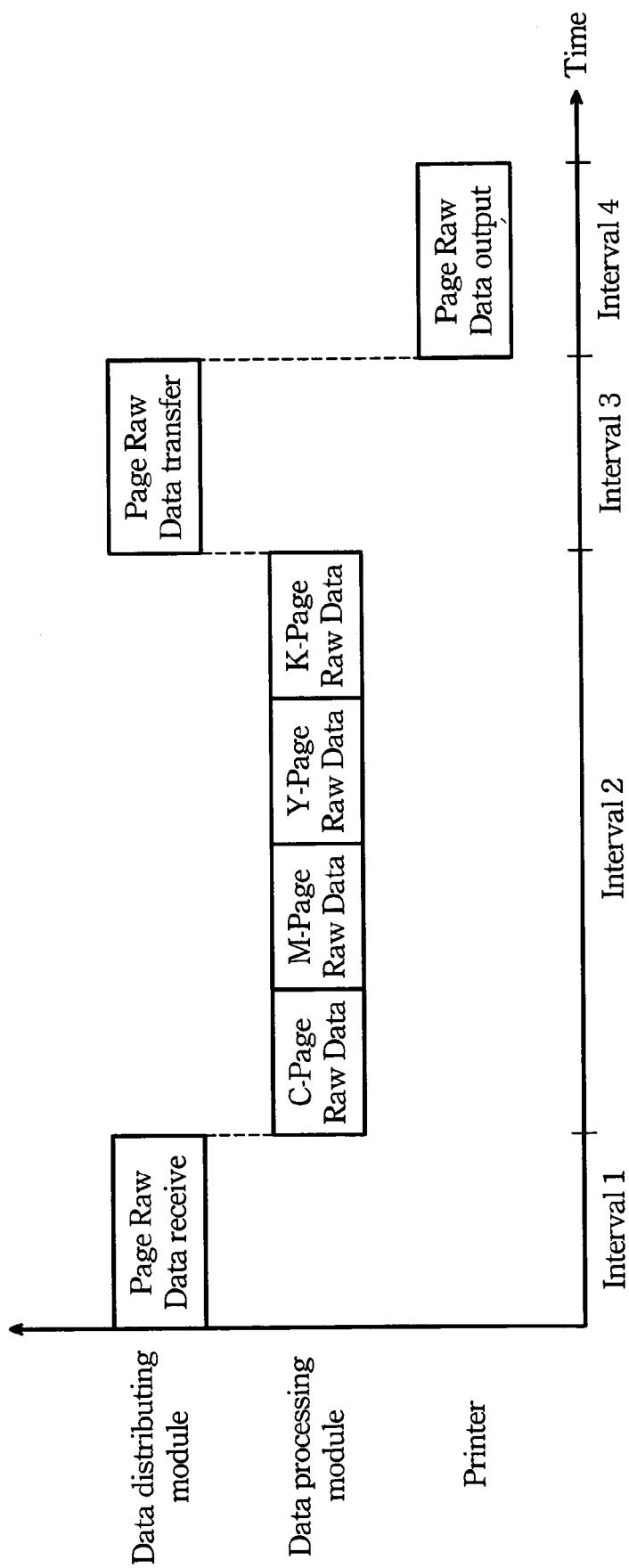
FIG. 1B is a data process flow sequence according to conventional color converting system shown in FIG. 1A.
Figure 1C:
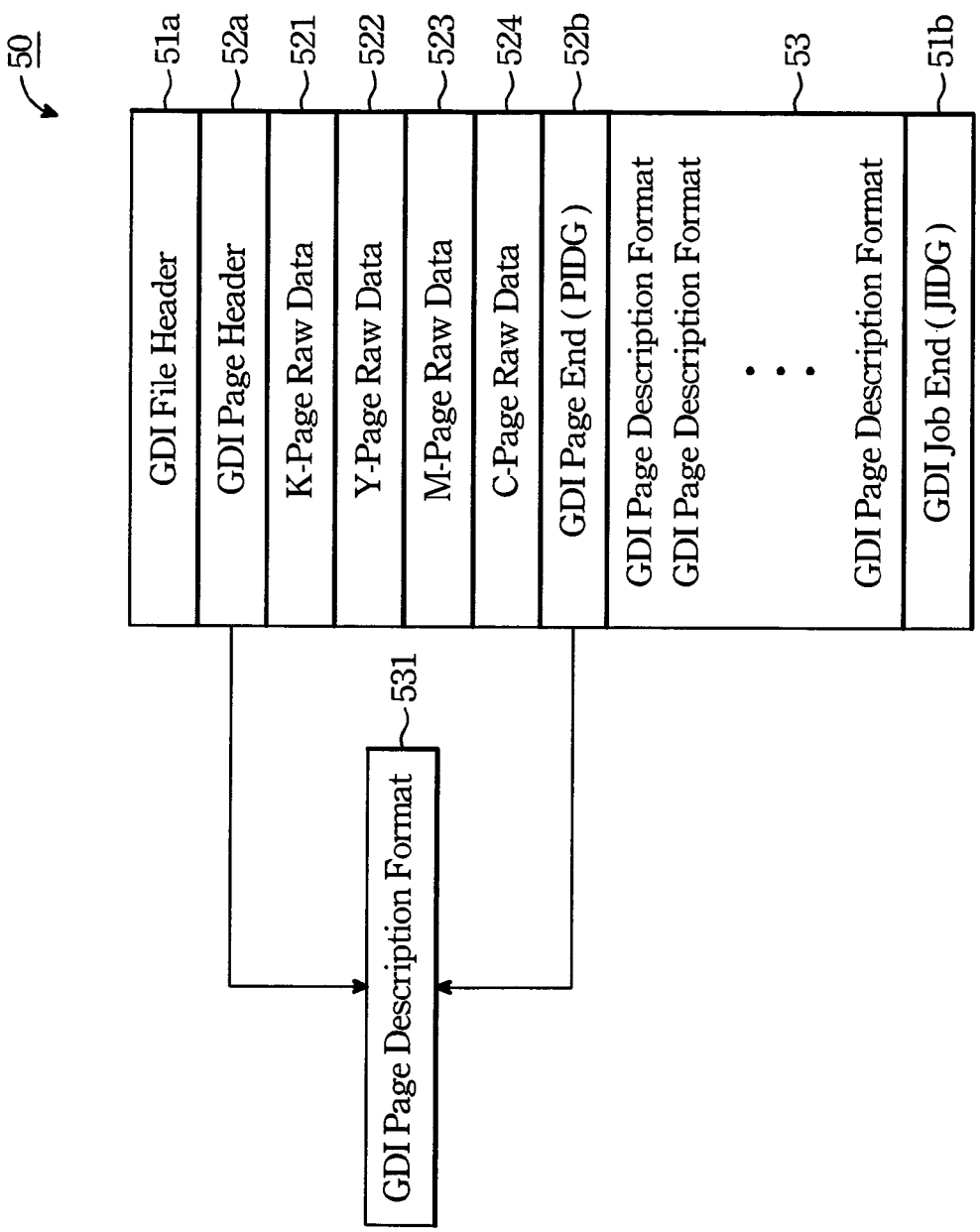
FIG. 1C is a data structure of a graphic file processed by means of the page mode.
Figure 5:
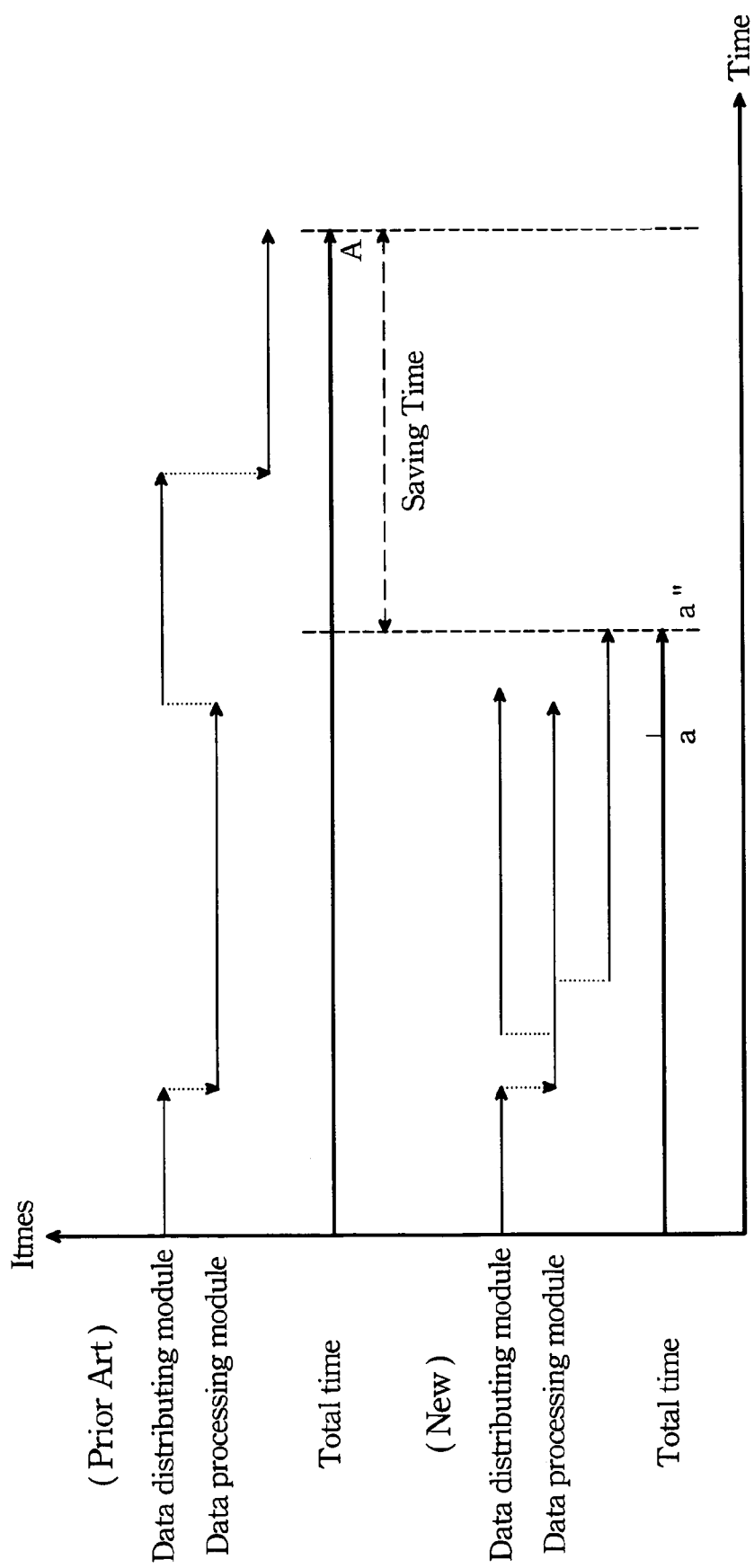
FIG. 5 is the process time comparison between prior art and this invention.

Referred to FIG. 1, FIG. 3 and FIG. 5, FIG. 5 is the process time comparison between prior art and this invention. Color format process in page mode is under serial run in prior art, but banding mode is under parallel run in this invention. So the process time can be shorten in this invention. As shown, the printing starts at time A after the printer receives an entire page. However, the printing starts in the interval from point a to point a'. In this interval, said printer receives 50%-100% of the bands having the second color format. The saving time is shown in FIG. 5.

To sum up, the prior art is modified as follows: 1. output data format modification; 2. data process flow modification; 3. data mode change. New data format process has included the page and band mode by different need. The difference between this two format data for printing are the page mode need to spend the one page time for data process and then send out the processed data to printer, but the banding mode is not necessary to wait for one page data ready to send out data. The banding mode can directly send out the band data to printer first if there is one banding data is ready. Characteristics and advantages of the invention are listed:

1. Banding mode for converting the color format of the data.
2. Output in real-time after converting the color format of the data and compression to shorten the output of the first page.
3. More efficiency for processing the graphic file or image data.
4. Lower memory volume requirement.

In the above described, at least one preferred embodiment has been elucidated with reference to drawings annexed, it is apparent that numerous variations or modifications may be made without departing from the true spirit and scope thereof, as set forth in the claims below.

What is claimed is:

1. A method for preliminary data processing before printing, comprising:
    dividing a page into a plurality of bands including a Mth band, a (M+1)th band and a (M+2)th band;
    converting a color format of the Mth band from RGB format to CMYK format, translating the Mth band into a bit-map data after converting the color format of the Mth band, and compressing the Mth band having the CMYK format;
    transferring the converted, translated, and compressed Mth band from a host computer to a printer for storing, and converting the color format of the (M+1)th band from RGB format to CMYK format, translating the (M+1)th band into a bit-map data after converting the color format of the (M+1)th band, and compressing the (M+1)th band having the CMYK format in the period of transferring the Mth band;
    printing the Mth band, wherein the printing starts before the printer receives 100% of the plurality of bands;
    transferring the converted, translated, and compressed (M+1)th band from the host computer to the printer for storing, and converting the color format of the (M+2)th band from RGB format to CMYK format, translating the (M+2)th band into a bit-map data after converting the color format of the (M+2)th band, and compressing the (M+2)th band having the CMYK format in the period of printing the Mth band; and
    continuing to convert the color format, translate into bit-map data, and compress of the residual bands, and transferring the converted, translated, and compressed residual bands from the host computer to the printer until the page is finished printing.

2. The method according to claim 1, further comprising determining a direction of dividing the page according to the direction of printing the page.

3. The method according to claim 1, wherein the step of the dividing a page into a plurality of bands comprises dividing the page along a vertical direction of the page.

4. The method according to claim 1, wherein the step of the dividing a page into a plurality of bands comprises dividing the page along a horizontal direction of the page.

5. The method according to claim 1, further comprising labeling said bands selectively after the step of compressing.

6. The method according to claim 5, further comprising in real time transferring said labeled bands to the printer after the step of the labeling.

7. The method according to claim 1, wherein printing starts after the printer receives at least 50% of the plurality of bands.

8. A system for preliminary data processing before printing, comprising:
    a data distributing module, within a host computer, receiving a page of data, and dividing the page of data into a plurality of bands including a Mth band, a (M+1)th band and a (M+2)th band to write into a first memory unit, wherein the page of data has a RGB color format;
    a data processing module, within the host computer, reading the bands stored in the first memory unit, and converting the RGB color format into a CMYK color format, wherein the CMYK color format is a recognition format of a printer, wherein said data processing module translates the bands into a bit-map data after converting the color format of the bands, wherein said data processing module compresses the bands having the CMYK color format; and
    a second memory unit, within the host computer, to store the compressed bands having the second color format, wherein the data distributing module reads the converted, translated, and compressed Mth band in order to transfer the Mth band to a printer and the color format of the (M+1)th band is converted from RBG format to CMYK format, the (M+1)th band is translated into a bit-map data, and the (M+1)th band having the CMYK format is compressed in the period of transferring the Mth band, wherein the data processing module continues converting the color format, translating into bit-map data, and compressing of residual bands of the page, and transferring the converted, translated, and compressed residual bands from the host computer to the printer until the page is finished printing.

9. The system according to claim 8, wherein said data distributing module reads the bands having the CMYK color format from said second memory unit in order to transfer to the printer, and said printer does not start until said printer receives at least 50% of the bands having the CMYK color format.

10. The system according to claim 8, wherein said data processing module reads immediately the bands after said data distributing module writes the bands into said first memory unit.

11. The system according to claim 8, wherein each of said bands having the CMYK color format includes an identification mark.

12. The system according to claim 11, wherein said bands having the identification mark are transferred to the printer.

13. The system according to claim 8, wherein each of said bands having the CMYK color format includes a plurality of mono-color layers.

14. The system according to claim 8, wherein said data distributing module divides the page into 20-30 bands, and writes into the first memory unit.

* * * * *